US012587559B2

(12) United States Patent
Beard et al.

(10) Patent No.: US 12,587,559 B2
(45) Date of Patent: *Mar. 24, 2026

(54) TIME-BASED APPROACHES IN MALWARE SIMULATION FOR RESPONSIVE MEASURE DEPLOYMENT

(71) Applicant: BRITISH TELECOMMUNICATIONS PUBLIC LIMITED COMPANY, London (GB)

(72) Inventors: Alfie Beard, London (GB); Tom Bowman, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/845,144

(22) PCT Filed: Feb. 13, 2023

(86) PCT No.: PCT/EP2023/053493

§ 371 (c)(1),
(2) Date: Sep. 9, 2024

(87) PCT Pub. No.: WO2023/169774

PCT Pub. Date: Sep. 14, 2023

(65) Prior Publication Data

US 2025/0267163 A1    Aug. 21, 2025

(30) Foreign Application Priority Data

Mar. 10, 2022    (GB) ..................................... 2203366

(51) Int. Cl.
H04L 9/40 (2022.01)

(52) U.S. Cl.
CPC ........ H04L 63/1433 (2013.01); H04L 63/145 (2013.01)

(58) Field of Classification Search
CPC .......................... H04L 63/1433; H04L 63/145
(Continued)

(56) References Cited

U.S. PATENT DOCUMENTS 7,739,740 B1 *  6/2010  Nachenberg .......... G06F 21/566
                                                              713/188
8,065,731 B1 *  11/2011  Nucci ................. H04L 63/1433
                                                              713/188
(Continued)

FOREIGN PATENT DOCUMENTS

| | | |
|---|---|---|
| CN | 109190375 | 1/2019 |
| EP | 1990973 | 11/2008 |

(Continued)

OTHER PUBLICATIONS

Office Action dated Dec. 2, 2024 issued for U.S. Appl. No. 17/904,467 (13 pages).
(Continued)

*Primary Examiner* — Dant B Shaifer Harriman
(74) *Attorney, Agent, or Firm* — Nixon & Vanderhye P.C.

(57)    ABSTRACT

A computer-implemented method of simulating the propagation of malware in a network is provided. The method comprises accessing a model of the network, where the model comprising a plurality of computer nodes and where each computer node of the plurality of computer nodes is connected to at least one edge of a plurality of edges. Each edge of the plurality of edges connects a pair of computer nodes of the plurality of computer nodes. The method further comprises initiating an outbreak of the malware in the model at a predetermined source computer node of the plurality of computer nodes, and propagating the malware through the model of the network from the source computer node over a plurality of step-times. The propagation is determined based on a rate of transmission per step-time for each edge, and each step-time of the plurality of step-times
(Continued)

corresponds to a temporal point that is universal across the network, such that at each step-time the malware propagation through the network occurs simultaneously for each edge of the plurality of edges according to the rate of transmission per step-time for each edge.

19 Claims, 6 Drawing Sheets

(58) Field of Classification Search
USPC .......................................................... 726/25
See application file for complete search history.

(56) References Cited

U.S. PATENT DOCUMENTS

| | | | |
|---|---|---|---|
| 8,683,585 B1 | 3/2014 | Chen | |
| 8,978,141 B2 * | 3/2015 | Eliseev | G06F 21/566 |
| | | | 726/24 |
| 9,060,018 B1 | 6/2015 | Yu et al. | |
| 9,332,029 B1 * | 5/2016 | Tikhonov | G06F 21/568 |
| 9,473,520 B2 * | 10/2016 | Dixon | H04L 63/1416 |
| 9,607,148 B1 * | 3/2017 | Magar | H04L 63/145 |
| 11,546,767 B1 | 1/2023 | Shaw | |
| 12,273,376 B2 | 4/2025 | Wang | |
| 2007/0150957 A1 * | 6/2007 | Hartrell | H04L 63/1425 |
| | | | 726/24 |
| 2008/0201129 A1 * | 8/2008 | Natvig | G06F 21/566 |
| | | | 703/22 |
| 2009/0320133 A1 * | 12/2009 | Viljoen | G06F 21/564 |
| | | | 726/24 |
| 2011/0041179 A1 * | 2/2011 | Ståhlberg | G06F 21/566 |
| | | | 726/23 |
| 2011/0078177 A1 | 3/2011 | Fakeih | |
| 2012/0151588 A1 | 6/2012 | Wang | |
| 2013/0007883 A1 | 1/2013 | Zaitsev | |
| 2013/0340080 A1 | 12/2013 | Gostev et al. | |
| 2018/0288087 A1 * | 10/2018 | Hittel | H04L 63/145 |
| 2019/0052659 A1 | 2/2019 | Weingarten et al. | |
| 2021/0014240 A1 * | 1/2021 | Wang | H04L 63/145 |
| 2022/0038467 A1 * | 2/2022 | Kimura | H04L 63/1433 |
| 2023/0123046 A1 | 4/2023 | Wang | |

FOREIGN PATENT DOCUMENTS

| | | |
|---|---|---|
| EP | 4222923 | 6/2024 |
| GB | 2574093 | 11/2019 |
| WO | 2006132987 | 12/2006 |
| WO | 2019185404 | 10/2019 |
| WO | 2019185405 | 10/2019 |
| WO | 2021 001235 | 1/2021 |
| WO | 2021001237 | 1/2021 |
| WO | 2021165256 | 8/2021 |
| WO | 2021165257 | 8/2021 |
| WO | 2021198295 | 10/2021 |
| WO | 2022069401 | 4/2022 |

OTHER PUBLICATIONS

Notice of Allowance dated Dec. 31, 2024 issued for U.S. Appl. No. 17/904,453 (9 pages).

Office Action dated Apr. 3, 2025 issued for U.S. Appl. No. 17/904,453 (17 pages).

Notice of Allowance dated May 1, 2025 issued for U.S. Appl. No. 17/995,365 (14 pages).

Notice of Allowance dated May 14, 2025 issued for U.S. Appl. No. 17/904,467 (22 pages).

International Preliminary Report on Patentability dated Sep. 19, 2024, issued for International Application No. PCT/EP2023/053486 (9 pages).

International Preliminary Report on Patentability dated Sep. 19, 2024, issued for International Application No. PCT/EP2023/053494 (10 pages).

International Preliminary Report on Patentability dated Sep. 19, 2024, issued for International Application No. PCT/EP2023/053489 (9 pages).

International Preliminary Report on Patentability dated Sep. 19, 2024, issued for International Application No. PCT/EP2023/053493 (9 pages).

Office Action dated Sep. 29, 2024, issued for U.S. Appl. No. 17/995,365 (33 pages).

Wanping Liu, Shouming Zhong, "Web malware spread modelling and optimal control strategies", published on Feb. 10, 2017 (19 pages).

Wright Rob, "What is polymorphic virus?—Definition from WhatIs. com", 2021, pp. 1-5 URL: httQs:/Iweb.archive.org/webI20211127061825/httQs:/ Iwww.techtarget.co (5 pages).

Jia Zhi-Juan et al, 2017 29th Chinese Control and Decision Conference (CCDC), 2017, "Research on computer virus source modeling with immune characteristics", pp. 4616-4619 p. 1, line 10, p. 2, col. 2, lines 16-17, p. 3, col. 2, lines 23-33, p. 4, col. 1, lines 6-10; figure 3; table 1, 2017 (4 pages).

Faghani Mohammad et al, 5th International Conference on New Technologies, Mobility and Security (NTMS), 2012, "A Study of Trojan Propagation in Online Social Networks", pp. 1-5 p. 3, col. 2, lines 11-16, 2012 (5 pages).

Beyah R A et al: "The case for collaborative distributed wireless intrusion detection systems", Granular Computing, 2006 IEEE International Conference on Atlanta, GA, USA May 10-12, 2006, Piscataway, NJ, USA, IEEE, May 10, 2006 (May 10, 2006), pp. 782-787, XP010918931 (6 pages).

Chenxi Wang et al: "On computer viral infection and the effect of immunization", Computer Security Applications, 2000, ACSAC '00. 16th Annual Conference E New Orleans, LA, USA Dec. 11-15, 2000, Los Alamitos, CA, USA, IEEE Comput. Soc, US, Dec. 11, 2000 (Dec. 11, 2000), pp. 246-256, XP010529822 (11 pages).

Combined Search & Exam Report for GB2203361.7 dated Oct. 7, 2022 (12 pages).

Combined Search & Exam Report for GB2203366.6 dated Oct. 21, 2022 (12 pages).

Combined Search and Exam Report for 2203371.6 dated Nov. 3, 2022 (12 pages).

Combined Search and Exam Report for 2004994.6 Dated Jul. 13, 2020.

Combined Search and Exam Report for GB2002121.8 Dated Aug. 4, 2020.

Piet Van Mieghem, Computer Communications, vol. 35, Apr. 18, 2012, "The viral conductance of a network", pp. 1494-1506 see Abstract Section 2 (8 pages).

Eder-Neuhauser Peter et al: "Malware propagation in smart grid networks: metrics, simulation and comparison of three malware types", Journal of Computer Virology and Hacking Techniques, Springer Paris, Paris, vol. 15, No. 2, Aug. 28, 2018 (Aug. 28, 2018), pp. 109-125, XP036784835 (17 pages).

Exam Report for GB2002122.6 dated Nov. 30, 2021.

Faghani Mohammad R. et al: "A Study of Trojan Propagation in Online Social Networks", 2012 5th International Conference on New Technologies, Mobility and Security (NTMS), May 1, 2012 (May 1, 2012), pp. 1-5, XP055966357, ISSN: 2157-4952, DOI: 10.1109/NTMS.2012.6208767 ISBN: 978-1-4673-0227-2 p. 3, col. 2, lines 11-16.

Combined Search & Exam ReEort for GB2020915.1 dated May 11, 2021 5 Pages).

Combined Search & Exam Report for GB2203355.9 dated Oct. 10, 2022.

Hernandez Guillen J D et al: "A mathematical model for malware spread on WSNs with population dynamics", Physica A, North-Holland, Amsterdam, NL, vol. 545, Nov. 22, 2019 (Nov. 22, 2019), XP086098687 (11 pages).

Hosseini Soodeh Ed—Vega-Rodriguez Miguel A et al: "Defense against malware propagation in complex heterogeneous networks", Cluster Computing, Baltzer Science Publishers, Bussum, NL, vol. 24, No. 2, Sep. 12, 2020 (Sep. 12, 2020), pp. 1199-1215, XP037444601 (17 pages).

Khan Muhamad Salman et al., IEEE International Symposium on Technologies for Homeland Security (HST), 2017, "Cognitive

(56) References Cited

OTHER PUBLICATIONS modeling of polymorphic malware using fractal based semantic characterization", pp. 1-7 p. 2, col. 1, lines 28-33, 2017 (7 pages).
International Preliminary Report on Patentability for PCT/EP2021/058360 issued Aug. 11, 2022 (14 Pages).
International Preliminary Report on Patentability for PCT/EP2021/053763 dated Sep. 1, 2022 (9 pages).
International Preliminary Report on Patentability for PCT/EP2021/053764 dated Sep. 1, 2022 (9 pages).
International Report on Patentability for PCT/EP2021/083783 dated Jul. 13, 2023 (8 pages).
International Search Report & Written Opinion for PCT/EP2023/053489 dated Apr. 13, 2023 (16 pages).
International Search Report & Written Opinion for PCT/EP2023/053486 dated Apr. 13, 2023 (16 pages).
International Search Report & Written Opinion for PCT/EP2023/053493 dated Apr. 21, 2023 (16 pages).
International Search Report & Written Opinion for PCT/EP2023/053494 dated Apr. 21, 2023 (17 pages).
International Search Report & Written Opinion for for PCT/EP2021/053763 dated Mar. 9, 2021 (13 pages).
International Search Report & Written OEinion for PCT/EP2021/053764 dated Mar. 9, 2021 (13 pages).
International Search Report & Written Opinion for PCT/EP2021/083783 dated Mar. 1, 2022 (15 pages).
James Atwood et al: "Fair treatment allocations in social networks", arxiv.org, Cornell University Library, 201 Olin Libray Cornell University Ithaca, NY 14853, Nov. 1, 2019 (Nov. 1, 2019), XP081531701 (11 pages).
Lev Muchnik et al: "Initial growth rates of epidemics fail to predict their reach: A lesson from large scale malware spread analysis", arxiv.org, Cornell University Library, 201 Olin Library Cornell University Ithaca, NY 14853, Aug. 2, 2020 (Aug. 2, 2020), XP081730585 (19 pages).
Liu Guannan et al: "An Approach to finding the cost-effective immunization target for information assurance", Decision Support Systems, Elsevier, Amsterdam, NL, vol. 67, Aug. 19, 2014 (Aug. 19, 2014), pp. 40-52, XP029020334 (13 pages).
Matsubara Yasuko et al., "Nonlinear Dynamics of Information Diffusion in Social Networks", ACM Transactions on the Web (TWEB), ACM New York, 03 NY, USA, 2 Penn Plaza, Suite 701 New York NY 10121-0701 USA, 04 vol. 11, No. 2, Apr. 24, 2017 (Apr. 24, 2017), pp. 1-40, XP058693139 (40 pages).
Search Report for GB2002122.6 Dated Aug. 4, 2020 (4 pages).
Search Report for GB2002122.6 dated Nov. 30, 2021 (3 pages).
Examination Report for EP21824337.6 dated Jul. 1, 2024 (5 pages).
Extended European Search Report for EP 20157627.9 dated Jun. 12, 2020 (9 pages).
Extended European Search Report for EP 20157626.1 dated Jun. 12, 2020 (10 pages).
Extended European Search Report for 20168112.9 dated Sep. 4, 2020 (9 pages).
International Search Report and Written Opinion for PCT/EP2021/058360 dated Jun. 2, 2021 (12 pages).
US Non-Final Office Action for U.S. Appl. No. 17/904,453 dated Jun. 21, 2024 (12 pages).
Written Opinion for PCT/EP2021/058360 dated Apr. 22, 2022 (7 pages).
Xu Sheng et al: "Analysis of Malware-Induced Cyber Attacks in Cyber-Physical Power Systems", IEEE Transactions on Circuits and Systems II: Express Briefs, IEEE, USA, vol. 67, No. 12, Dec. 2020, pp. 3482-3486, XPO11822703 (5 pages).
U.S. Appl. No. 18/845,189, filed Sep. 9, 2024, Simulation of Malware With Changing Signatures.
U.S. Appl. No. 18/844,729, filed Sep. 6, 2024, Contact Rates in Malware Simulation for Responsive Measure Deployment.
U.S. Appl. No. 18/844,731, filed Sep. 6, 2024, Determining a Reproduction Number for a Malware.
Office Action dated Nov. 24, 2025 issued for U.S. Appl. No. 18/845,189 (13 pages).
Office Action dated Nov. 24, 2025, issued for U.S. Appl. No. 18/844,731 (12 pages).
Office Action for U.S. Appl. No. 18/844,729, dated Dec. 16, 2025 (9 pages).

* cited by examiner

TIME-BASED APPROACHES IN MALWARE SIMULATION FOR RESPONSIVE MEASURE DEPLOYMENT

CROSS-REFERENCE TO RELATED APPLICATIONS

This application is the U.S. national phase of International Application No. PCT/EP2023/053493 filed Feb. 13, 2023 which designated the U.S. and claims priority to GB 2203366.6 filed Mar. 10, 2022, the entire contents of each of which are hereby incorporated by reference.

TECHNICAL FIELD

Embodiments described herein relate generally to simulations of malware propagation through computer networks.

BACKGROUND

Conventional malware protection mechanisms are reactive to the detection of malware in a network or the widespread distribution of anti-malware measures. Such approaches are known as "diagnosis and treatment". Mitigation measures such as anti-malware or malware-specific protective measures may not be known for some time after an infection has been studied for its effects. Accordingly, it is beneficial to provide improvements in the simulation of the propagation of such infections through computer networks, thereby allowing for faster and more appropriate selection of malware protection mechanisms.

SUMMARY OF INVENTION

The present application relates to the field of a simulation of a network and, in particular, a network subject to a threat or attack such as malware or the like. The simulation is arranged to simulate the propagation of the threat through the network as each entity in the network (i.e. each device or machine) goes through a process of being susceptible to infection, then infected, then detected (i.e. infection is detected), then ultimately removed (e.g. the infection is either remediated, mitigated or the entity is disconnected/removed from the network).

In accordance with a first aspect of the invention, there is provided a computer-implemented method of simulating the propagation of malware in a network, the method comprising: accessing a model of the network, the model comprising a plurality of computer nodes, each computer node of the plurality of computer nodes being connected to at least one edge of a plurality of edges, wherein each edge of the plurality of edges connects a pair of computer nodes of the plurality of computer nodes; initiating an outbreak of the malware in the model at a predetermined source computer node of the plurality of computer nodes; and propagating the malware through the model of the network from the source computer node over a plurality of step-times, the propagation being determined based on a rate of transmission per step-time for each edge; wherein each step-time of the plurality of step-times corresponds to a temporal point that is universal across the network, such that at each step-time the malware propagation through the network occurs simultaneously for each edge of the plurality of edges according to the rate of transmission per step-time for each edge.

The present invention therefore provides a method of simulating the propagation of malware through a computer network, where the simulation provided employs a universal time frame across all the computers on the network. By employing a universal time frame, and propagating the malware through the simulated computer network according to a chosen step-time length, the simulation is more realistic, allowing for a better understanding of the behaviour of the malware in the specific computer network in question. As a result, a malware protection measure may be selected that is more effective and therefore more able to contain, counteract, or pre-emptively prevent a real malware infection in that computer network.

Any of the following may be applied to the above first aspect of the invention.

The rate of transmission per step-time may be based on a contact rate per step time, and the contact rate per step time for each edge of the plurality of edges may be calculated based on the amount of network traffic passing between corresponding computer nodes over the plurality of step-times.

The contact rate for each edge of the plurality of edges may be adjusted over the plurality of step-times according to changes in the amount of network traffic passing between corresponding computer nodes between each step-time.

During the propagation of the malware, newly infected computer nodes of the plurality of computer nodes may include an incubation period, the incubation period occurring over at least one step-time of the plurality of step-times.

During the incubation period, the detection rate per step-time for the corresponding infected computer node may be zero.

Alternatively, during the incubation period, the detection rate per step-time for the corresponding infected computer node may increase over the incubation period.

The rate of transmission for each edge may additionally include a weighting factor, the weighting factor being based on the estimated behaviour of users of the network over at least one step-time of the plurality of step-times.

The weighting factor may be adjusted over the plurality of step-times according to changes in the estimated behaviour of users of the network over at least one step-time of the plurality of step-times.

In accordance with a second aspect of the invention, there is provided a computer implemented malware protection method to protect at least a subset of a set of computer systems from a malware, the method comprising: simulating a propagation of the malware through the set of computer systems using a model of the set of computer systems, wherein the simulating comprises any of the methods of the first aspect of the invention discussed above; and identifying one or more malware protection measures to be deployed to one or more of the set of computer systems based on the simulating.

In accordance with a third aspect of the invention, there is provided a computer implemented malware protection method to protect at least a subset of a set of computer systems from a malware, the method comprising: accessing a model of the set of computer systems, the model identifying computer systems in the set and interactions therebetween based on previous communication occurring between the computer systems, each interaction being identified for an interacting pair of computer systems, wherein each computer system is identified by the model as having an indication of a state of malware infection as at least one of susceptible to infection by the malware and infected by the malware; simulating a propagation of the malware through the set of computer systems using the model, wherein the simulating comprises any of the methods of the first aspect of the invention discussed above; and responsive to the simulating step, identifying one or more malware protection measures to be deployed to one or more of the set of computer systems.

The computer implemented malware protection method of the second or third aspect of the invention may additionally include deploying the one or more malware protection measures to the one or more computer systems.

In accordance with a fourth aspect of the invention, there is provided a system comprising: one or more processors; a non-transitory memory; and one or more programs, wherein the one or more programs are stored in the non-transitory memory and configured to be executed by the one or more processors, the one or more programs including instructions for performing any of the methods of the first, second, or third aspects of the invention discussed above.

In accordance with a fifth aspect of the invention, there is provided a non-transitory computer readable storage medium storing one or more programs, the one or more programs comprising instructions, which, when executed by an electronic device with one or more processors, cause the electronic device to perform any of the methods of the first, second, or third aspects of the invention discussed above.

In the following, embodiments will be described with reference to the drawings in which.

DETAILED DESCRIPTION

The simulation of the present application models the propagation of a threat/infection/malware across the network based on modelled network communications and interactions between entities. Conventionally, such simulations employ a variety of parameters in such a model including: infection rates; detection rates; removal rates and the like. In conventional simulations, these rates are defined for the entire simulation, or at least a network or sub-network.

Figure 1:
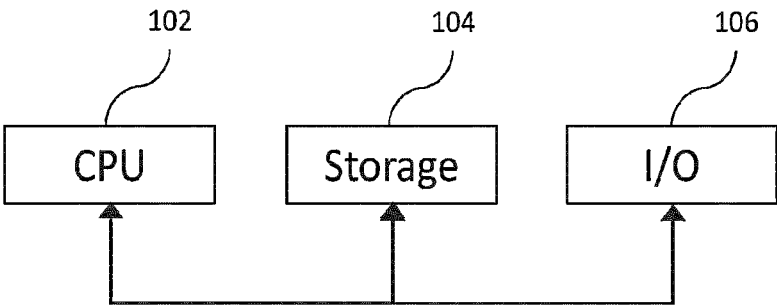
FIG. 1 shows a block diagram of a computer system suitable for the operation of the method according to some embodiments.

FIG. 1 is a block diagram of a computer system suitable for the operation of the present method according to some embodiments. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer—overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system, and propagation of the malware to other computer systems. The effects of malware on the operation and/or security of a computer system lead to a need to identify malware in a computer system in order to implement protective and/or remedial measures.

While malware detection is often directed to computer systems themselves or the networks over which they communicate, embodiments of the present invention recognise that interactions between computer systems transcend the physical interconnections therebetween.

In particular, embodiments of the present invention are directed to addressing interactions between electronic devices or computer systems that arise from communication between pairs of electronic devices or computer systems in a network. Such interactions can include, for example, interactions between users of each of a pair of electronic device or computer systems using, inter alia, social media, messaging, electronic mail or file sharing facilities. Thus, embodiments of the present invention employ a model or simulation of a set of electronic devices or computer systems in which interacting pairs of computer systems are identified, such interactions being based on previous communication occurring between the electronic device or computer systems in the pair.

Notably, such a model (or simulation) may disregard intermediates in an interaction—such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like.

As a result, a model (or simulation) of the physical communication becomes burdened by the intermediate features of a typical inter-computer communication. In contrast, embodiments of the present invention address the endpoints of an interaction such as the computer systems through which users communicate. A similar analysis can be conducted for interactions involving email, electronic messaging, file sharing and the like.

Ideally, the behaviour and characteristics of an infection in the simulation of the infected network accurately reflects the behaviour and characteristics of an infection in a real network. Embodiments of the present invention relate to improvements in such simulations, providing a more accurate simulation of the propagation of malware through a network (i.e. compared with the propagation of malware through a real network). This allows for a more effective determination of suitable mitigation measures that can be employed to mitigate the spread of the malware, or infection, throughout the network. The deployment of malware protection measures is targeted to provide an effective and/or efficient inhibition of the propagation of the infection on the network.

The nature and type of malware protection measures themselves are understood by those skilled in the art and can include, inter alia: anti-malware facilities; malware filters; malware detectors; a block, preclusion or cessation of interaction and/or communication, such as between computer systems; and/or a reconfiguration of one or more computer systems or communications facilities therebetween.

Embodiments of the present invention identify computer systems or interacting pairs of computer systems for the deployment of malware protection measures based on a simulation of a propagation of malware through the model of a set of computer systems. Such a simulation employs simulation parameters including: a rate of interaction (or a contact rate) between each interacting pair of computer systems (i.e. a number of interactions per time period); a rate of transmission of the malware between interacting computer systems per interaction; a rate of detection of malware in the network; and a rate of removal of computer systems from the network to slow or stop the rate of infection. Some or all of these parameters may be derived statistically according to a statistical distribution. In some embodiments, some or all of these parameters may be determined based on historical interaction information over a historical time period. In some embodiments, some or all of these parameters are determined based on one or more machine learning processes based on historical interaction information.

Preferably, mitigation measures are intended to directly affect the transmission rate, detection rate, and/or removal rate for a malware, or an infection, propagating through a network. For example, implementing an adjustment or supplement to security facilities such as antimalware, proxies, firewalls and the like within the network such as by modifying policies for such facilities can directly affect one or more of these rates.

Mitigative measures can further include protective or interruptive measures including one or more of, inter alia: deployment of malware remediation facilities such as anti-malware; the isolation of a subset of the network by interrupting communications along one or more selected edges; the disconnection of one or more devices from the network; the instigation of protective measures in respect of data stored at devices in advance of their predicted infection such as backup, storage, offlining or disconnection of sensitive data stores; the generation of new networks of devices such as to exclude devices predicted to be infected; affecting a transmission rate within a network or between pairs of devices in the network such as by throttling or otherwise affecting a rate or frequency of communication between devices, or to limit/constrain a "size" of communication (e.g. payload size) or otherwise constrain communication (e.g. imposing new limits) [all of these are particularly beneficial]; and the propagation of alerts and/or information to devices on the network. Such mitigative measure can be determined and configured cognisant of the time required to effect such mitigation and the forecast state of the network and malware infection over such a time period.

Figure 2:
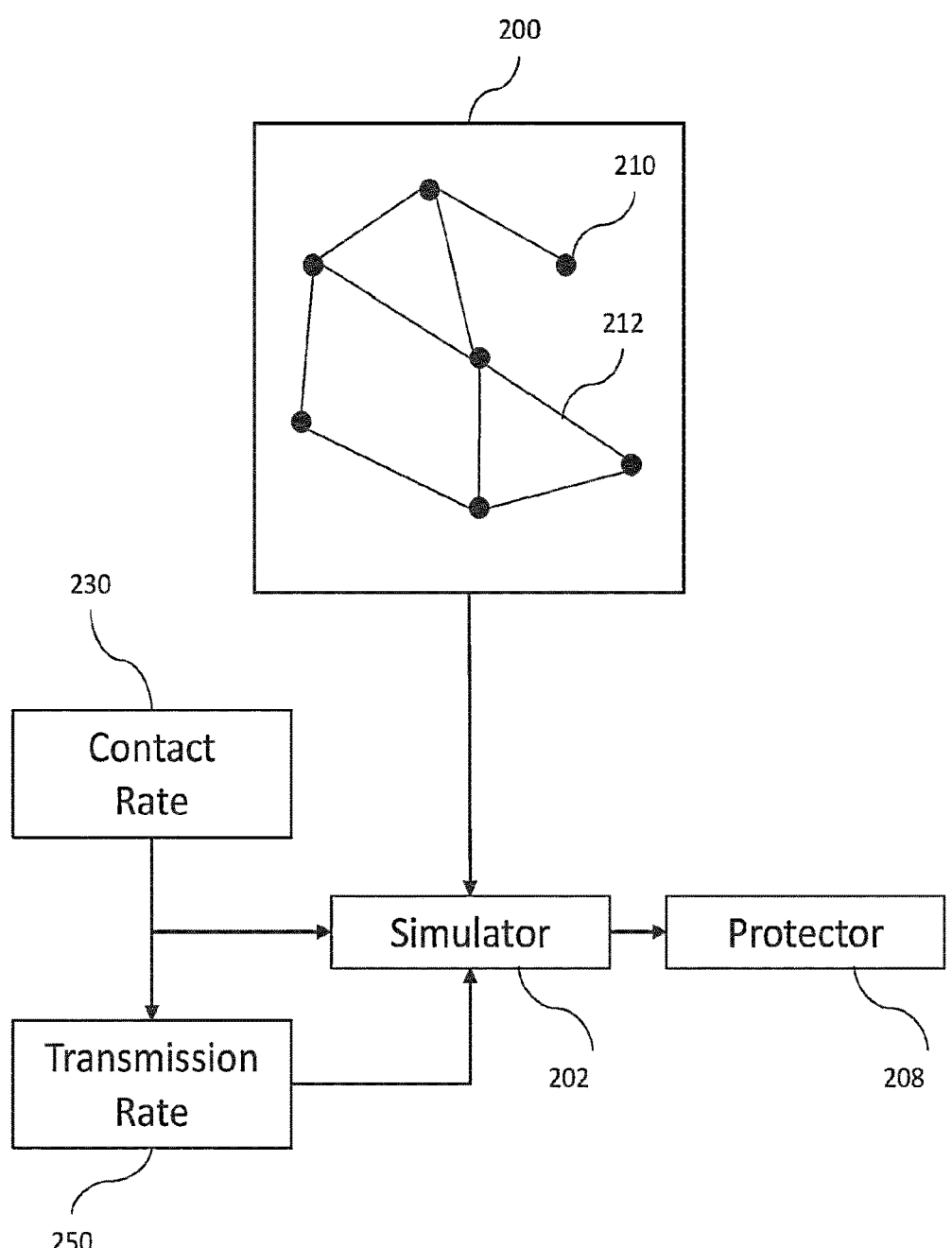
FIG. 2 shows a component diagram of an arrangement for malware protection for at least a subset of a set of computer systems according to some embodiments.

FIG. 2 is a component diagram of an arrangement for malware protection for at least a subset of a set of computer systems according to an embodiment of the present invention. A model 200 is provided as one or more data structures representing a set of computer systems and interactions therebetween. Preferably, the model is provided as a graph or similar data structure including nodes or vertices 210, each corresponding to a computer system, and edges 212 each connecting a pair of nodes 210 and representing interaction between electronic devices or computer systems corresponding to each node in the pair. Thus, an edge 212 represents interaction between a pair of electronic devices or computer systems. Each node 210 can have associated information for a corresponding node (i.e. electronic device or computer system) including, for example, inter alia: an identifier of the computer system; an identification of an organisational affiliation of the computer system; an identifier of a subnet to which the computer system is connected; and other information as will be apparent to those skilled in the art.

Preferably, an edge 212 constitutes an indication that at least one interaction has taken place over at least a predetermined historic time period between computer systems in a pair. Preferably, the existence of an edge 212 is not determinative, indicative or reflective in of itself of a degree, frequency, or propensity of interaction between computer systems in a pair. Rather, the edge 212 identifies that interaction between nodes can or has taken place. In some embodiments, edges 212 can have associated, for example, inter alia: an edge identifier; an identification of a pair of nodes (and/or the corresponding electronic devices or computer systems) that the edge interconnects; and/or interaction frequency information between a pair of computer systems.

It will be appreciated by those skilled in the art that, while the model 200 is illustrated as a literal graph in the arrangement of FIG. 2, alternative data structures and logical representations of vertices and edges can be used, such as representations employing, for example, inter alia, vectors, arrays of vectors, matrices, compressed data structures and the like.

The arrangement of FIG. 2 includes a simulator 202 as a hardware, software, firmware or combination component arranged to perform a simulation of a propagation of a malware in the set of computer systems represented by the model 200.

The simulator 202 is operable on the basis of simulation parameters including: an contact rate as a number of interactions between pairs of interacting computer systems in a time period; and a transmission rate 250 as a rate of transmission of a malware between computer systems in a pair of systems per interaction. The transmission rate 250 is a probability of transmission of a malware from one node to another node during an interaction between the nodes. The transmission rate 250 may incorporate aspects of a malware infection process.

For example, in the case of malware transmitted as a web-link between two computer systems by email, the transmission rate can reflect all of: a probability that an email is communicated between the two computer systems; a probability that the email includes the malicious web-link; and a probability that a recipient accesses the malicious web-link resulting in malware infection.

The simulator 202 can operate on the basis of configurable characteristics such as simulation assumptions. For example, the simulator 202 may operate on the basis that any computer system as represented by a node in the model 200 can only transmit the malware to first-degree neighbours according to the model 200.

Further, the simulator 202 preferably operates on the basis that each computer system has a state of infection at a point in time. States of infection at a point in time can include, for example: a state of susceptibility in which a computer system is susceptible to infection, such as a computer system that is not and has not been so far infected and is not specifically protected from infection by a particular malware; a state of infected in which a computer system is subject to infection by the malware at the point in time; and a state of removed or remediated in which a computer system is remediated of a past infection or protected from prospective infection by the malware.

It will be appreciated by those skilled in the art that sub-states of these states can also be employed, such as, inter alia: an infected state that is not infectious (i.e. transmission of malware cannot be effected by a computer system in such a state); an infected state that is infectious; an infected state that is detected; and an infected state that is not detected (such as might be determined by the simulator 202).

Therefore, in use, the simulator 202 is operable for a time period to model the propagation of a malware infection. In some embodiments, one or more predetermined source computer systems represented in the model 200 are selected as originating computer systems for the malware infection such that propagation is simulated from such originating computer systems. Preferably, the simulator 202 is executed for each of a plurality of time periods so as to model the propagation of the malware in the set of computer systems over time. Additionally or alternatively, the simulator 202 can be performed a plurality of times for each of a plurality of predetermined source computer systems selected as originating computer systems for the malware infection.

Figure 3:
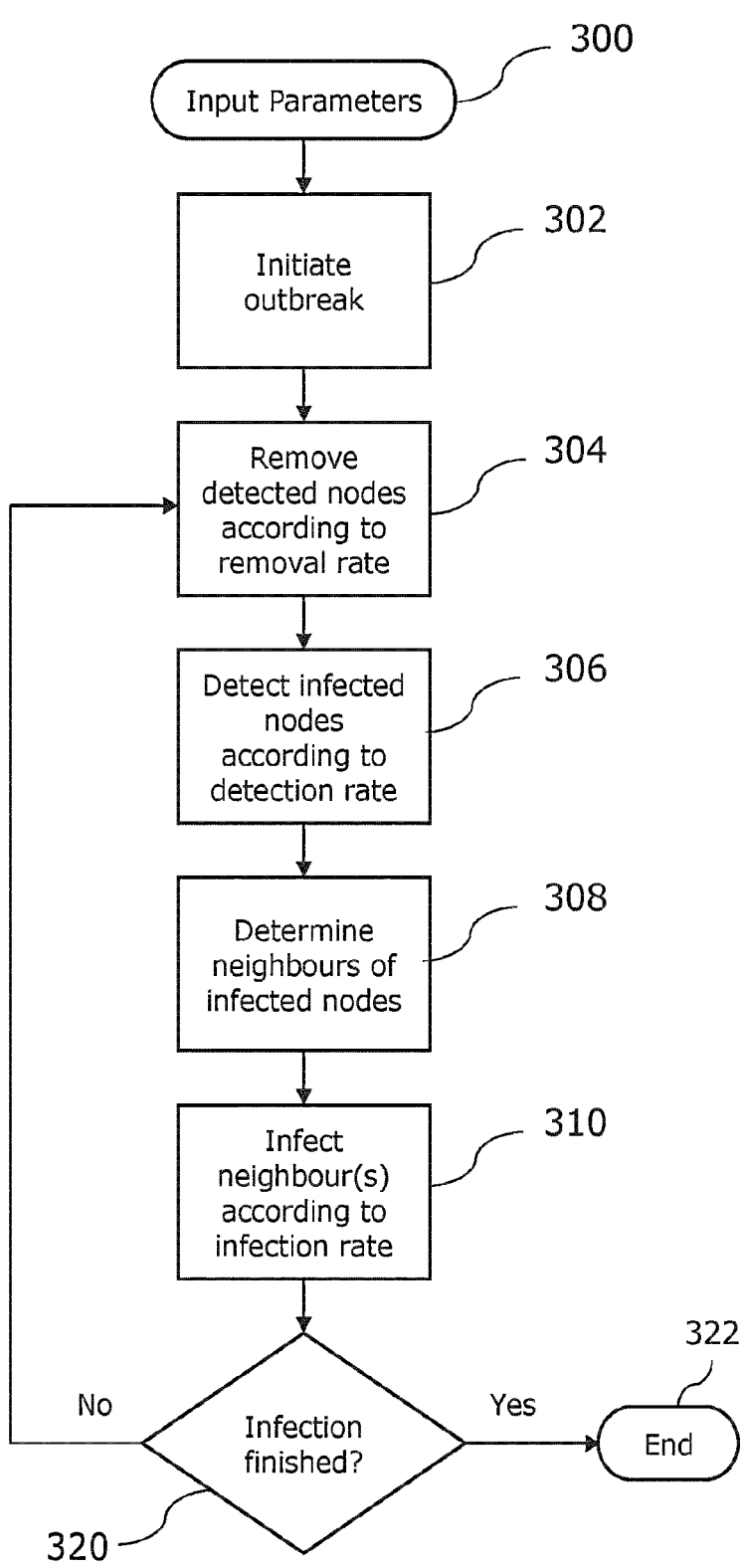
FIG. 3 shows a flowchart of a simulation of malware propagation through a network according to some embodiments.

FIG. 3 is a flowchart illustrating a simulation of propagation of a malware according to some embodiments. In this example, the simulation is built on a network graph model (e.g. such as that illustrated in FIG. 2).

At step 300, several parameters are defined for the simulation and input into the simulator, including a removal rate, a detection rate and an infection rate. Each of these parameters takes a value between 0 and 1. In some embodiments, one or malware protection measures may be deployed. The malware protection measures may be any one of the malware protection measures described herein.

In the present example, each of the nodes has four Boolean states: susceptible, infected, detected, and removed. Initially, every node is set to susceptible, uninfected, undetected and not removed. At step 302, an outbreak is initiated by setting the state of one or more nodes to infected. These nodes may be referred to as "outbreak nodes".

At step 304, detected nodes are randomly removed from the network according to the removal rate. That is to say, the infected nodes that have been detected are isolated from the rest of the network (i.e. by severing the connection to neighbouring nodes). The state of these nodes is set to "removed".

At step 306, a number of the infected nodes are detected according to the detection rate. The state of these nodes is set to "detected".

At step 308, the neighbours of the infected nodes are determined. The susceptible neighbours are then infected according to the infection rate at step 310. The state of these nodes is set to "infected".

At step 320, it is determined whether the infection is finished, i.e. whether the malware is able to spread any further, or if the maximum number of steps for the simulation has been reached. For example, if the infected nodes are all removed, then these nodes cannot infect any other nodes and the malware cannot spread any further. If the malware cannot spread any further, the simulation ends at step 322, and optionally statistics for the simulation are calculated. Otherwise, if the malware can still spread further, steps 304-310 are repeated.

Steps 304 to 308 are discussed above in a particular sequence. However, it will be appreciated that this sequence is not intended to be limiting, and steps 304 to 308 may instead be carried out in any appropriate sequence or order.

As is further shown in FIG. 2, responsive to the simulation by the simulator 202, and, in particular, responsive to the model of propagation of a malware determined by the simulator 202, a protector component 208 may be implemented. Here, the protector 208 may be operable to deploy malware protection measures intended to inhibit a propagation of the malware through the set of computer systems. The protector component 208 may be a hardware, software, firmware or combination component arranged to access output from the simulator 202 such as one or more models, data structure representations, images, animations, visually renderable indications or other suitable representations of states of nodes corresponding to simulated states of computer systems in the set of computer systems. For example, a representation of states of computer systems may be provided based on the model 200 so as to indicate, for each computer system by way of a node in the model 200, a state of the computer system (such as susceptible, infected, removed) over each of a plurality of time periods for which the simulator 202 was executed.

The protector 208 may identify one or more computer systems or interacting pairs of computer systems (such as are represented by edges 212 in the model 200) for the deployment of malware protection measures. Such identified systems or pairs of systems can be selected based on, for example, inter alia: a computer system or interacting pair of systems through which malware propagates in the simulation to a subset of other computer systems in the set of computer systems; identifying a subset of computer systems having a relatively greater, or greatest, proportion of computer systems infected by the malware according to the simulation, so as to identify one or more computer systems or pairs of systems as a gateway, link or bridge to such identified subset; a number of computer systems to which the malware is propagated via a computer system or pair of systems; and other criteria as will be apparent to those skilled in the art. For example, "choke-points" in the model 200 can be identified by the protector 208 based on the simulator 202 output as nodes or pairs of nodes representing computer systems or interacting pairs of systems constituting pathways for propagation of the malware to subsets of nodes in the model 200. The malware protection measures deployed by the protector 208 can include those previously described, and in this way at least a subset of the set of computer systems can be protected from the malware by the targeted deployment of malware protection measures.

In view of the above, the simulator 202 can be used to simulate the propagation of malware through a computer network (or computer system) in a realistic manner, such that the protector 208 may use the simulation to improve the selection of one or more appropriate malware protection measures for implementing in the computer network. Such appropriately selected one or more malware protection measures may then be deployed in a computer network (or computer system), either in response to a real malware infection, or as a pre-emptive measure to prevent or reduce the likelihood of an infection propagating. Consequently, the more realistic the simulation of malware propagation in the modelled computer network is, the better the protector 208 is able to select an appropriate and effective malware protection measure to contain, counteract, or pre-emptively prevent a real malware infection in the computer network.

In conventional malware propagation simulations, infection propagation within a network operates on the basis of iterating through steps of a simulation such that, at each step, determinations of infection, detection, removal etc. are evaluated until a point where the infection is determined to be unable to propagate any further (e.g. because the infection is fully remediated, or because there is no more network left to infect such as through complete infection or isolation of the threat by disconnecting entities in the simulated network).

This conventional step-based approach to simulation is not a realistic model of a real network in which there is no inherent synchronisation to universal/global step events for the entire network (i.e., events in the real world occur in natural/real time). An analogy can be drawn between playing a game of chess one turn at a time (a step-based approach), versus being able to make any move at any point without consideration of turn-taking, and practically potentially multiple such moves simultaneously.

In the present application, a temporal approach is applied to the simulation of malware propagation such that each step corresponds to a temporal point (a point in time) that is universal to the network. In particular, this permits the use of temporal indicators or constraints on simulated processes such as infection, detection and removal.

For example, a period of incubation can be defined temporally as a time period during which a malware infects an entity without being detectable (akin to biological incubation periods during which the effect of infection may not be discernible to a host).

Similarly, a period can be defined before or during which infection of other devices may be possible, where such periods are defined temporally.

For example, in a real-world scenario, a malware may not infect other devices until it has communicated with its own command and control server/service, the time period for which can be predetermined or variable.

Here, a temporal specification of such periods is facilitated by a simulation of universal time across iterations of the model such that modelled entities are operable to respond to the progression of time in a manner that is faithful to that of observed threat propagation.

This approach is particularly beneficial considering the prospect of different entities modelled in the network, such as different computers, with different architectures, different software and services, each having a potential impact on the temporal criteria for a modelling parameter, such as how long (temporally) an incubation period lasts, and how long an infectious period may last (or when it may start, and/or stop).

Figure 4:
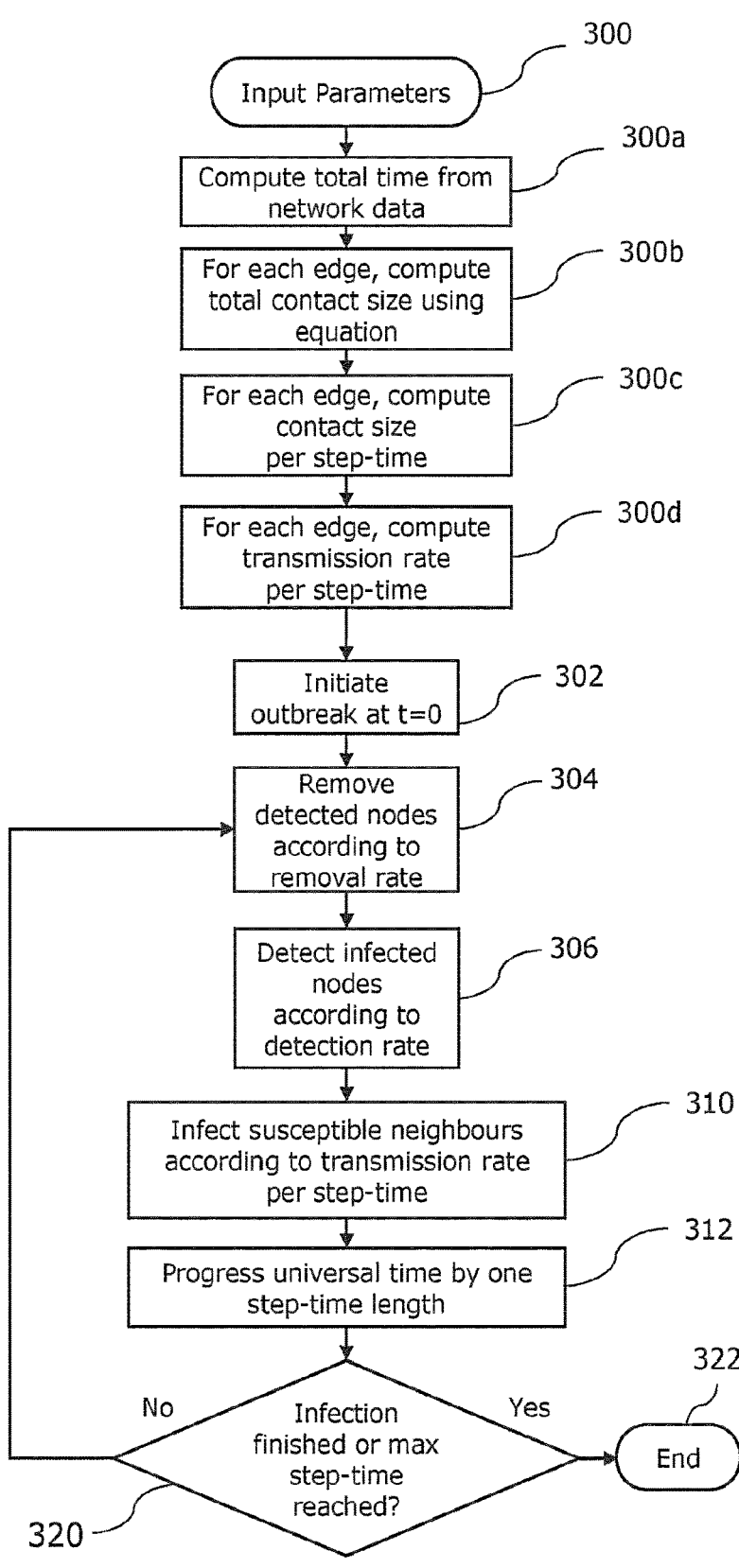
FIG. 4 shows a flowchart of a simulation of malware propagation through a network employing a universal time frame, according to some embodiments.

FIG. 4 shows a flowchart for a simulation in which a real time approach is employed according to some embodiments. Here, at step 300, the network graph model is inputted to the simulator, along with the chosen maximum number of step-times (i.e. the maximum time for the simulation). In addition, sample network traffic data is input into the simulator, along with the chosen step-time length, which may be based on the time period covered by the sample network traffic data and the maximum number of step-times chosen. In some embodiments, a set of real network traffic data for the network in question may also be inputted to the simulator, allowing for an accurate simulation of malware propagation based on real network traffic data. In addition, details for the transmission of the malware in question is also input into the simulator, along with an appropriate detection rate and removal rate.

At step 300*a*, the total time for the simulation is chosen. This value may be computed based upon the network traffic data, or may be chosen arbitrarily and scaled based on network traffic data. For instance, the network traffic data may cover a period of 3 hours, and therefore the total time covered by the simulation is 3 hours. This allows the step-time length to reflect a period of real time (e.g. 5 seconds, 10 minutes etc.) based on the network traffic data.

That is to say, the step-time length can be set arbitrarily to whatever step-time is of interest (for example, 1 day, 6 hours, 10 minutes, or 30 seconds), and the contact rate 230 may be scaled to reflect the network traffic data.

Here, the total period over which network traffic data is captured may be used in calculating the number of contacts (i.e. the contact size 240) over each step-time length (resulting in the contact rate per step-time length).

For example, if the step-time interval is 1 hour and there is 3 hours of sample network traffic data, then the total contact size 240 must be scaled by a factor of ⅓ in order to account for this (e.g. for an edge with 30 defined contacts over the 3 hours, where the step-time length is 1 hour, then this is 10 contacts per hour, or 10 contacts per step-time length). However, if instead a step-time length of 30 minutes is chosen, then this would result in 5 contacts per 30 minutes, or 5 contacts per step-time length.

The total time for which the simulation is run for is therefore flexible, so that the simulation could run to cover a 24 hour period, based on 3 hours of network traffic data, so long as the contacts over the 3 hours of network traffic data are scaled to the selected step-time length.

Then, at step 300*b*, the total contact size 240 for each edge is calculated using an appropriate equation based on the chosen definition of a "contact" (discussed in further detail below).

Then, at step 300*c*, the total contact size per step-time for each edge 212 is calculated, by dividing the total contact size 240 for that edge by the maximum number of step-times chosen for the simulation.

At step 300*d*, the transmission rate 250 per step time for each edge 212 is then calculated from the total contact size per step-time for each edge 212 using an appropriate equation (discussed in further detail below).

At step 302, the outbreak is initiated at t=0, and a source node 210 is infected with the malware.

At step 304, detected nodes are removed from the network according to the removal rate. That is to say, the infected nodes that have been detected are isolated from the rest of the network (i.e. by severing the connection to neighbouring nodes) according to the removal rate. The state of these nodes is set to "removed".

At step 306, a number of the infected nodes are detected according to the detection rate. The state of these nodes is set to "detected".

At step 310, the neighbours of the infected nodes are determined. The susceptible neighbours are then infected according to the infection rate. The state of these nodes is set to "infected".

At step 312, the universal time frame of the simulation is increased by the chosen step-time length.

At step 320, it is determined whether the infection is finished. This may for example be determined based on whether the malware is able to spread any further, or if the current step-time value is equal to the maximum number of step-times for the simulation. For example, if the infected nodes are all removed, then these nodes cannot infect any other nodes and the malware cannot spread any further. Similarly, if the malware can spread further, but has crossed a predetermined threshold (for example, 80% of nodes being infected), the simulation may end, and the relevant statistics associated with the simulation can be calculated at step 322. Alternatively, if the malware can spread further, but the current step-time value is equal to the maximum number of step-times for the simulation, then the simulation may end, and the relevant statistics associated with the simulation can be calculated at step 322.

Otherwise, if the malware can still spread further, or if the maximum number of step-times for the simulation has not been reached, steps 304 to 320 may be repeated.

Steps 304 to 320 are shown in FIG. 4 and discussed above in a particular sequence. However, this is simply for clarity of presentation, and in an approach where these steps are carried out in a universal time frame for the simulation, these steps effectively occur simultaneously within that universal time frame.

That is to say, since the simulation is carried out according to a universal time frame, rather than a conventional step-based approach, the steps of removing the detected nodes according to the removal rate (step 304), detecting infected nodes according to the detection rate (step 306), and infecting neighbouring nodes according to the transmission rate per step-time (step 310), occur simultaneously within the universal time frame of the simulation.

This therefore increases the realism of the simulation, allowing for a more accurate understanding of how the malware in question would propagate through the network in question, leading to improved methods for containing and/or removing the infection.

When determining the total contact size 240 for each edge, a "contact" on an edge may be defined in a number of different ways.

For instance, a "contact" may be determined based on the number of packets of data, or flows, passing along an edge 212. In such a case, the total contact size for an edge may be defined using the following equation:

$$total\_contact\_size\_for\_edge = \left\lfloor \frac{\#flows}{single\_contact\_size} \right\rfloor \quad (1)$$

For example, if a "contact" is defined as 5 packets of data/flows (i.e. single_contact_size in Equation 1), and a given edge passed a total of 56 packets of data/flows (i.e. # flows in Equation 1) over the total time for the simulation, then the total contact size for that edge would be 11.

Alternatively, a "contact" may be determined based on the amount of data passing along an edge 212. In such a case, the total contact size for an edge may be defined using the following equation:

$$total\_contact\_size\_for\_edge = \left\lfloor \frac{\#bytes}{single\_contact\_size} \right\rfloor \quad (2)$$

For example, if a "contact" is defined as 50 bytes of data (i.e. single_contact_size in Equation 2), and a given edge passed a total of 2480 bytes of data (i.e. # bytes in Equation 2) over the total time for the simulation, then the total contact size for that edge would be 49.

As a further alterative, an appropriate equation combining the aspects of Equations 1 and 2 may be used if a "contact" is defined both in terms of flows and the amount of data passing along an edge over the given time period.

The total contact size per edge 212 is then used to calculate the contact rate 230 for each edge 212 per step-time. This is achieved by dividing the total contact size for a given edge 212 by the maximum number of step-times chosen. For example, if the total contact size for an edge 212 is equal to 49, and the maximum number of step-times chosen is 30, then the contact rate 230 for that edge 212 per step-time is 1.63.

After a contact rate 230 for each edge 212 per step-time is determined, the transmission rate 250 for each edge 212 per step time can then be used to calculate the probabilistic rate at which malware would propagate along that particular edge 212 (i.e. from one associated infected node to a neighbouring associated uninfected node).

In some embodiments, the transmission rate 250 for a particular edge 212 per step-time may be calculated using the following equation:

$$transmission\ rate\ for\ edge = 1 - (1-p)^{contact\_rate\_per\_step\_time} \quad (3)$$

For example, if the transmission rate 250 for one contact (i.e. p in Equation 3) is set to be equal to 0.02, and the contact rate 230 for that edge 212 per step-time (i.e. the number of contacts per step time, or contact_rate_per_step_time in Equation 3) is equal to 1.63, then the transmission rate 250 for that particular edge 212 is 0.032.

The transmission rate 250 for one contact (i.e. p in Equation 3) may be set based upon specific parameters associated with the particular simulation in question. For instance, the transmission rate 250 for one contact may be based upon the specific network in question, or the specific type of malware that is being simulated.

Equation 3 above may be derived from known laws of probability. Nonetheless, it will be understood that a skilled reader may choose to employ a different suitable equation for calculating the transmission rate 250 for a given edge 212 per step-time.

In some embodiments, the contact rate 230 may be calculated based on typical levels network traffic for a particular time of day. For instance, if the network traffic along a given edge 212 or group of edges 212 (i.e. between two or more given nodes or devices/computer systems in the network) is known to be higher at a certain time of day (e.g. morning or evening), then the simulation can be set to include a contact rate 230 for that edge 212 or edges 212 that reflects that level of network traffic for that time of day.

In some embodiments, the contact rate 230 for each edge 212 may be dynamically adjusted based on changing levels network traffic over the course of the simulation. Here, the network will naturally behave differently during different time periods (e.g., morning, afternoon, evening, night, or, Monday, Tuesday, etc.).

Therefore, a dynamic temporal network model may be implemented which alters the contact rates 230 between devices (i.e. the contact rates 230 for each edge 212) depending on the current time period, using the network traffic data.

This provides the advantage of capturing the changes between different time periods from the network traffic data, allowing for a more comprehensive and realistic network model to be built, which alters according to the different times of day.

This enables more realistic malware propagation. For instance, during the night malware is less likely to spread as there is less network activity and fewer devices connected. The same can be said for different days of the week, for instance contact rates on a typical Wednesday compared with contact rates on a typical Sunday.

In this scenario, the network traffic data may be analysed to identify "clusters" of network activity during certain time periods. Such clusters can then be used to identify suitable time windows over the period covered by the network traffic data. Once a set of suitable time windows have been identified, the network traffic data can be split into corresponding time windows.

Then, for each time window, the contact rate 230 for each edge 212 may be calculated (for example, using Equation 1 or 2 above) such that it reflects the number of contacts that occur along that edge 212 during that time window. As a result, the transmission rate 250 for each edge 212 may also then be calculated (for example, using Equation 3 above) to be specific for the time window in question.

As a result, when running the simulation, the propagation of the malware through the network reflects the amount of activity in the network for each time window (for instance, a time window from 8 am to 10 am on a Tuesday). As the simulation progresses to the next time window, the contact rates 230 and transmission rates 250 for each edge 212 are updated to reflect the amount of network traffic activity for that time window.

In some embodiments, the transmission rate 250 for each edge 212 may include an inherent transmission rate 250 for one contact that is different for different time windows (e.g. different times of day). This may be set by the user (i.e. by adjusting the value of p in Equation 3 above) and may be, for example, larger later in the week to reflect users on the network dropping their guard and applying less stringent security protocols. This additional weighting in the transmission rate 250 for each edge 212 may be combined with the aspect of the transmission rate 250 that is derived from the contact rate 230 for each edge 212.

In some embodiments, the transmission rates 250 per step-time may be calculated on the fly, instead of being calculated at prior to the start of the outbreak. This may take the form of adjusting the transmission rate 250 based on changes in the contact rate 230 during the simulation, or may be based upon adjusting the weighting factor during the simulation to reflect changes in user activity over the simulated time period. This allows for new data to be included as and when it becomes available and allows for the recentness-based contact rates 230 to be more realistic, as the contact rates 230 (and, by extension, the transmission rates 250) are recalculated based on the current time of the simulation.

In some embodiments, the propagation of the malware through the network may include an incubation period. When a node 210 (i.e. an electronic device or computer system) in the network is infected with the malware, the malware may then be unable to infect a neighbouring node 210 along a corresponding edge 212 until a given period of incubation time has passed. This can be understood as a period in which the node 210 is "being infected".

Introducing an incubation period means that the realism of the malware simulation can be further improved.

For example, the malware may not infect other devices or nodes 210 until it has communicated with its own command and control server/service, or may require time in which to fully infect that node 210 (i.e. by making changes to that node 210).

In addition, the incubation period may be defined temporally as a time period during which the malware infects an entity without being detectable.

Incubation periods may not be the same for all nodes 210 or devices in the network. Instead, in some embodiments, the incubation rate may be specific to the device or node 210 in question. In some embodiments, the incubation rate may depend on the type of device in question, or may dependent upon the type of operating system or the particular software running on that device.

Figure 5:
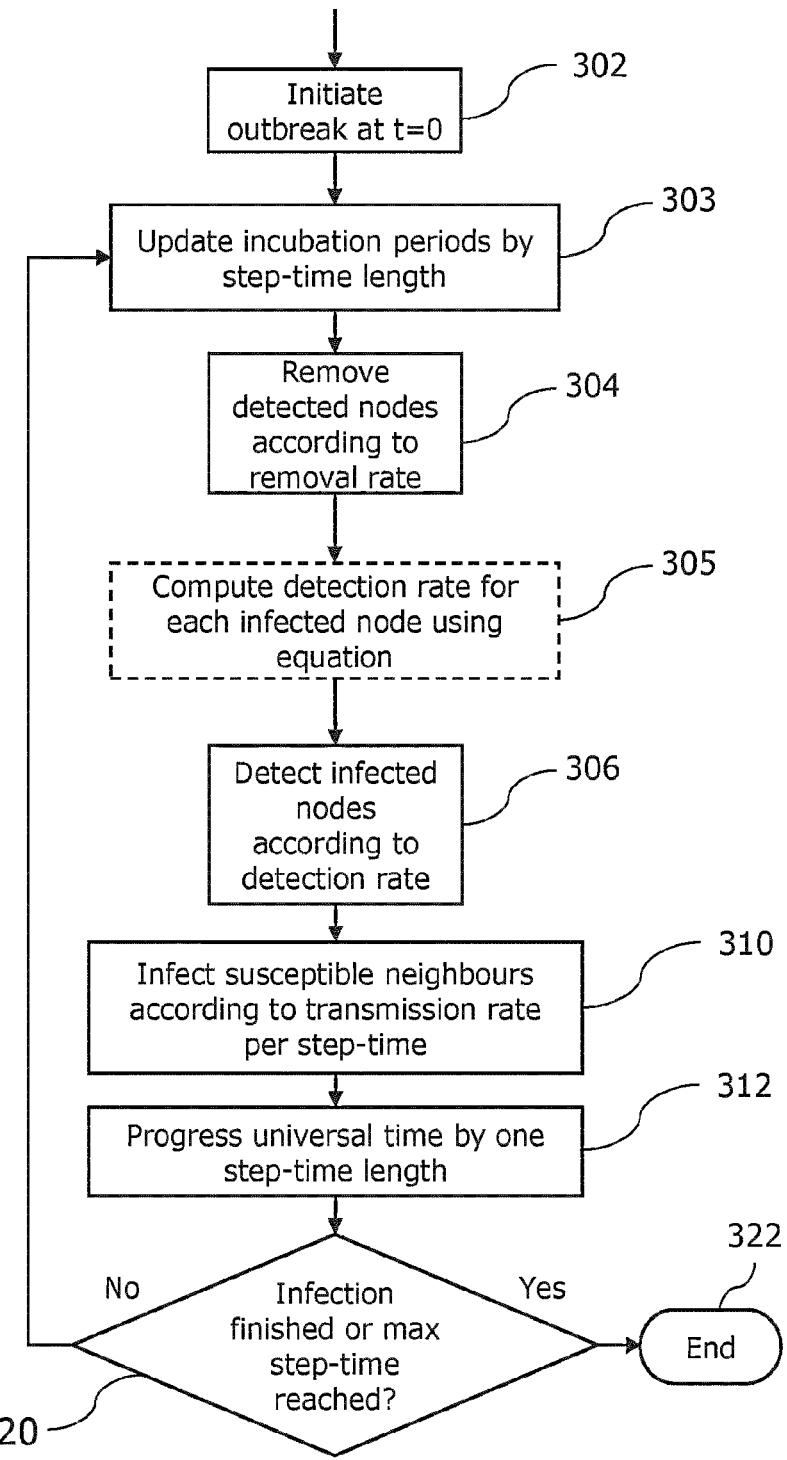
FIG. 5 shows a flowchart of a simulation of malware propagation through a network employing a universal time frame, incubation periods, and adjusted detection rates, according to some embodiments.

FIG. 5 shows a flowchart depicting the introduction of such an incubation period. Here, steps 300 to 300d proceed in the same manner as discussed above with regard to FIG. 4, with the exception that the chosen incubation period is additionally input into the simulator at step 300. For instance, the incubation period may be set to 10 minutes.

At step 302, the outbreak is initiated at t=0, and the source node 210 is infected with the malware.

At step 303, the incubation period is updated according to the chosen step-time length. For instance, if the incubation period is set to be 10 minutes, and the step-time length for the simulation is set to be 2 minutes, then the remaining incubation period is updated accordingly to be 8 minutes as the step-time length is updated.

At step 304, any infected nodes that have been detected are removed according to the removal rate (at the beginning of the simulation, no infected nodes have been detected, and therefore none are removed).

At step 306, any infected nodes are detected according to the detection rate. If a given node is infected but is still within its incubation period, that infected node 210 may not yet be detectable (i.e. the detection rate for an infected node 210 in its incubation period is zero).

Alternatively, in some embodiments, an infected node 210 that is still within its incubation period may still be detectable, albeit with a reduced likelihood of detection (i.e. a lower detection rate). That is to say, the chance of detecting the infection on that device increases over the course of the incubation period (i.e. as the malware makes changes on the device). This is shown in FIG. 5 in the optional step 305, in which the detection rate is calculated for each of the infected nodes 210 using an appropriately chosen equation.

Here, the detection rate may be defined by an equation that accounts for the node 210 being in its incubation period. For instance, the detection rate may be zero or close to zero at the start of the incubation period, and increase as the incubation period progresses. In some embodiments, the detection rate may increase over the incubation period in a linear, exponential, or any other suitably chosen manner. For example, the equation for calculating the detection rate may take a linear form such as:

$$\text{Detection rate} = \begin{cases} xi_t + c \ \text{if} \ i_t \leq i_{period} \\ D \ \text{if} \ i_t > i_{period} \end{cases} \quad (4)$$

Here, $i_t$ is the current incubation time, and $i_{period}$ is the chosen incubation period. The factors x and c may be chosen to set an appropriate linear relationship between the current incubation time $i_t$ and the total incubation time $i_{period}$, and the factor D may be chosen to be an appropriate value (i.e. between 0 and 1) for when the infected node 212 has completed its incubation period.

At step 310, the infected nodes 210 infect neighbouring nodes 210, along their corresponding edges 212, according to the transmission rate 250 per step-time. If a node 210 is infected, then the incubation period for that newly infected node 210 is set to the initial chosen incubation period (i.e. 10 minutes).

At step 312, the universal time frame of the simulation is increased by the chosen step-time length.

Then, at step 320, the simulator checks whether the simulation has reached the chosen maximum number of step-times. If the chosen maximum number of step-times has not been reached, the simulation returns to step 303. If the chosen maximum number of step-times has been reached, then the simulation of the outbreak ends and the relevant statistics associated with the simulation can be calculated at step 322.

Figure 6:
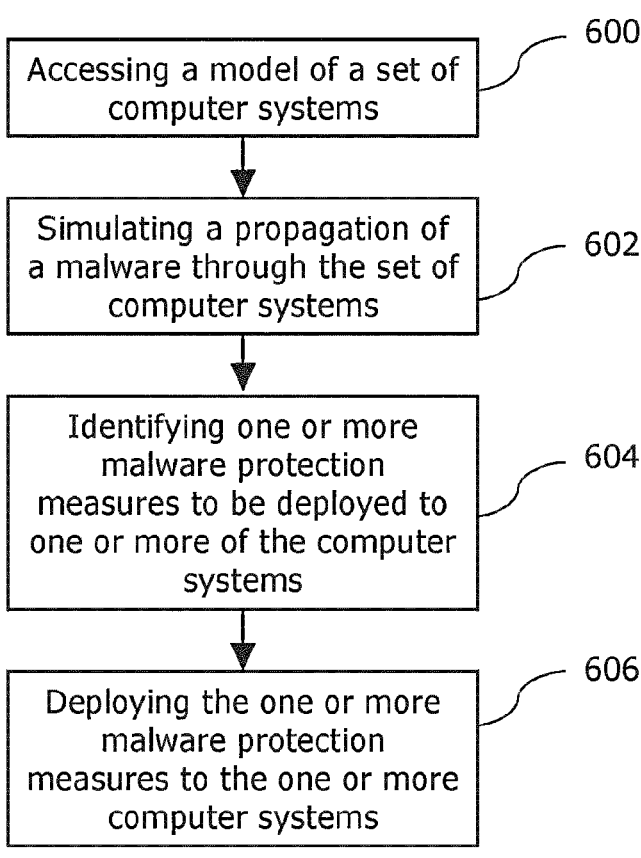
FIG. 6 shows a flowchart of a malware protection method employing the simulation according to some embodiments.

FIG. 6 is a flowchart of a malware protection method according to some embodiments. The malware protection method aims to protect at least a subset of a set of computer systems from a malware.

At step 600, a model of a set of computer systems is accessed. The model may be a graph, e.g. as shown in FIG. 2. The model identifies computer systems in the set and interactions therebetween based on previous communication occurring between the computer systems. Each interaction is identified for an interacting pair of computer systems, and each computer system is identified by the model as having an indication of a state of malware infection as one of susceptible to infection by the malware and infected by the malware.

At step 602, propagation of the malware through the set of computer systems is simulated using the model (e.g. by the simulator 202). The simulation may be performed using any of the methods described herein, for example the method described above in relation to any of FIGS. 3 to 5.

At step 604, one or more malware protection measures that are to be deployed to one or more computer systems are identified. The malware protection measures are identified based on the results of the simulation performed in step 602.

At step 606, the malware protection measures identified in step 604 are deployed to the one or more computer systems (e.g. by the protector 208).

The malware protection measure selected may then be better informed by the implementation of a more realistic simulation in which a temporal parameter is included. Due to the inclusion of time as a parameter in the simulator 202, a more realistic propagation pattern for the malware is possible, which offers better predictive capabilities for the threat at hand. That is to say, employing a simulation according to embodiments described herein will lead to different choices of what the optimal mitigation measure or measures are.

Conventional simulators have no notion of time and therefore any step is for an arbitrary unit of time. In the simulations described herein, each step is for a defined time period.

For example, in cases where step-time lengths are considered, the contact rates 230 are derived from sample network traffic data and are dependent upon the step-time length. As a result, lower contact rates 230 for a shorter period of time are obtained, and therefore lower transmission rates 250. Hence, the transmission rates 250 are updated to be more realistic with regard to the specific time period (or step-time length) selected.

After one step-time length in the simulation, a simulated mitigation measure may be implemented. The mitigation measure selected may be different compared with a conventional simulator that has no notion of time, (for instance, isolating a central infected node), whereas in a simulator according to the present embodiments it may be more favourable to isolate a different detected node 210 (i.e. isolating a different node, or patching neighbouring nodes to prevent infection). These selected mitigation measures are driven by the step-time length of the malware, allowing for more mitigation measures to be implemented for the malware for the same period of time compared with conventional simulations.

Further advantages may be provided by implementing a simulation in which the selection of the temporal parameter (i.e. the step-time length) reflects a particular time of day. Where transmission rates 250 may be lower for a given time of day (e.g. during the night), the mitigation measure(s) selected may be different to a measure(s) selected during periods where transmission rates 250 are higher (e.g. during the day).

In some scenarios employing a simulation according to embodiments described herein, it may be preferable to allow an infection to proceed during time periods where the transmission rate 250 is lower (e.g. during the night), by forecasting the pattern of infection and increasing the logging on an infected node(s). This allows for more information to be learned about the particular malware in question (for instance, incubation behaviour) during a time period in which the damage to the computer network is not excessive, providing a better understanding of how to detect and respond to that particular malware in future.

In some other scenarios, it may be preferable to select a malware mitigation measure that is more aggressive (e.g. removing an infected node 210 or group of nodes 210 from the network) during periods of low network activity (e.g. during the night), since there is less chance of disrupting users.

In conventional simulations that do not employ a temporal parameter (i.e. a step-time length as described herein), the optimal protection or mitigation measure may instead be to patch all connected nodes to an infected node, which may require more time and place a heavier burden on the computer network as a whole.

Non-optimal mitigation(s) may fail to resolve the threat and can cause unnecessary consequences, hence using a temporal parameter ensures more realistic simulations that provide for improved mitigation measures.

The above discussed method may be performed using a computer system or similar computational resource, or system comprising one or more processors and a non-transitory memory storing one or more programs configured to execute the method. Likewise, a non-transitory computer readable storage medium may store one or more programs that comprise instructions that, when executed, carry out the methods described herein.

Whilst certain embodiments have been described, these embodiments have been presented by way of example only, and are not intended to limit the scope of the application. Indeed, the novel devices, and methods described herein may be embodied in a variety of other forms; furthermore, various omissions, substitutions and changes in the form of the devices, methods and products described herein may be made without departing from the scope of the present application. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage. The accompanying claims and their equivalents are intended to cover such forms or modifications as would fall within the scope of the application.

The invention claimed is:

1. A computer-implemented method of simulating the propagation of malware in a network, the method comprising:

accessing a model of the network, the model comprising a plurality of computer nodes, each computer node of the plurality of computer nodes being connected to at least one edge of a plurality of edges, wherein each edge of the plurality of edges connects a pair of computer nodes of the plurality of computer nodes;

initiating an outbreak of the malware in the model at a predetermined source computer node of the plurality of computer nodes; and propagating the malware through the model of the network from the source computer node over a plurality of step-times, the propagation being determined based on a rate of transmission per step-time for each edge;

wherein each step-time of the plurality of step-times corresponds to a temporal point that is universal across the network, such that at each step-time the malware propagation through the network occurs simultaneously for each edge of the plurality of edges according to the rate of transmission per step-time for each edge.

2. The method according to claim 1, wherein the rate of transmission per step-time is based on a contact rate per step time, and wherein the contact rate per step time for each edge of the plurality of edges is calculated based on the amount of network traffic passing between corresponding computer nodes over the plurality of step-times.

3. The method according to claim 2, wherein the contact rate for each edge of the plurality of edges is adjusted over the plurality of step-times according to changes in the amount of network traffic passing between corresponding computer nodes between each step-time.

4. The method according to claim 1, wherein during the propagation of the malware, newly infected computer nodes of the plurality of computer nodes include an incubation period, the incubation period occurring over at least one step-time of the plurality of step-times.

5. The method according to claim 4, wherein during the incubation period, the detection rate per step-time for the corresponding infected computer node is zero.

6. The method according to claim 4, wherein during the incubation period, the detection rate per step-time for the corresponding infected computer node increases over the incubation period.

7. The method according to claim 1, wherein the rate of transmission for each edge additionally includes a weighting factor, the weighting factor being based on the estimated behaviour of users of the network over at least one step-time of the plurality of step-times.

8. The method according to claim 7, wherein the weighting factor is adjusted over the plurality of step-times according to changes in the estimated behaviour of users of the network over at least one step-time of the plurality of step-times.

9. A computer implemented malware protection method to protect at least a subset of a set of computer systems from a malware, the method comprising:

simulating a propagation of the malware through the set of computer systems using a model of the set of computer systems, wherein the simulating comprises accessing a model of the network, the model comprising a plurality of computer nodes, each computer node of the plurality of computer nodes being connected to at least one edge of a plurality of edges, wherein each edge of the plurality of edges connects a pair of computer modes of the plurality of computer nodes;

initiating an outbreak of the malware in the model at a predetermined source computer node of the plurality of computer nodes; and propagating the malware through the model of the network from the source computer node over a plurality of step-times, the propagation being determined based on a rate of transmission per step-time for each edge;

wherein each step-time of the plurality of step-times corresponds to a temporal point that is universal across the network, such that at each step-time the malware propagation through the network occurs simultaneously for each edge of the plurality of edges according to the rate of transmission per step-time for each edge; and identifying one or more malware protection measures to be deployed to one or more of the set of computer systems based on the simulating.

10. The method of claim 9, comprising:

deploying the one or more malware protection measures to the one or more computer systems.

11. A system for simulating propagation of malware in a network comprising:

one or more processors;

a non-transitory memory; and one or more programs, wherein the one or more programs are stored in the non-transitory memory and configured to be executed by the one or more processors so that the system for simulating the propagation of malware in the network is at least configured to:

access a model of the network, the model comprising a plurality of computer nodes, each computer node of the plurality of computer nodes being connected to at least one edge of a plurality of edges, wherein each edge of the plurality of edges connects a pair of computer nodes of the plurality of computer nodes;

initiate an outbreak of the malware in the model at a predetermined source computer node of the plurality of computer nodes; and propagate the malware through the model of the network from the source computer node over a plurality of step-times, the propagation being determined based on a rate of transmission per step-time for each edge;

wherein each step-time of the plurality of step-times corresponds to a temporal point that is universal across the network, such that at each step-time the malware propagation through the network occurs simultaneously for each edge of the plurality of edges according to the rate of transmission per step-time for each edge.

12. A non-transitory computer readable storage medium storing one or more programs, the one or more programs comprising instructions, which, when executed by an electronic device with one or more processors, cause the electronic device to perform any of the methods of claim 1.

13. The system according to claim 11, wherein the rate of transmission per step-time is based on a contact rate per step time, and wherein the system is further configured to calculate the contact rate per step time for each edge of the plurality of edges based on the amount of network traffic passing between corresponding computer nodes over the plurality of step-times.

14. The system according to claim 13, wherein the system is further configured to adjust the contact rate for each edge of the plurality of edges over the plurality of step-times according to changes in the amount of network traffic passing between corresponding computer nodes between each step-time.

15. The system according to claim 11, wherein during the propagation of the malware, newly infected computer nodes of the plurality of computer nodes include an incubation period, the incubation period occurring over at least one step-time of the plurality of step-times.

16. The system according to claim 15, wherein during the incubation period, the detection rate per step-time for the corresponding infected computer node is zero.

17. The system according to claim 15, wherein during the incubation period, the detection rate per step-time for the corresponding infected computer node increases over the incubation period.

18. The system according to claim 11, wherein the rate of transmission for each edge additionally includes a weighting factor, the weighting factor being based on the estimated behaviour of users of the network over at least one step-time of the plurality of step-times.

19. The system according to claim 18, wherein the system is further configured to adjust weighting factor over the plurality of step-times according to changes in the estimated behaviour of users of the network over at least one step-time of the plurality of step-times.

* * * * *